United States Patent Office 2,983,956
Patented May 16, 1961

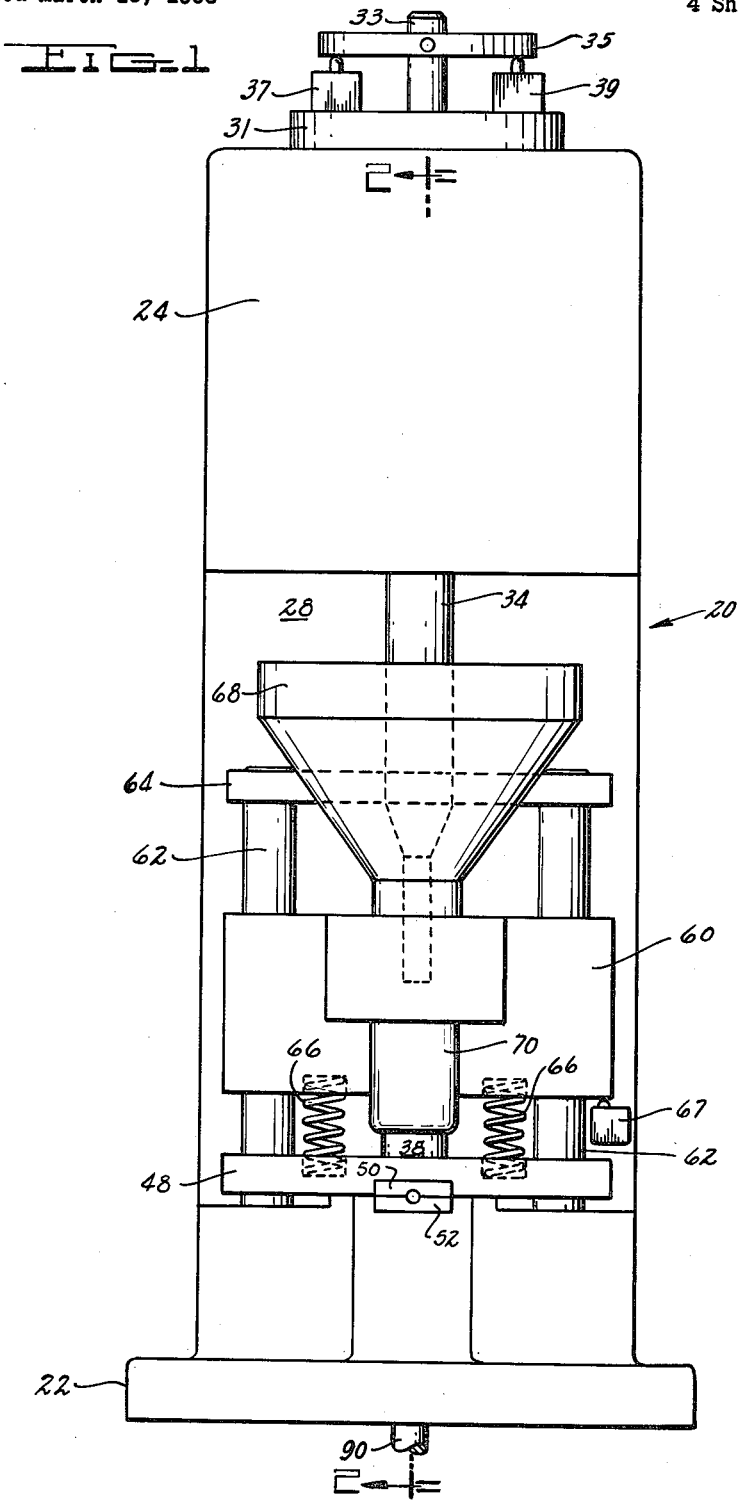

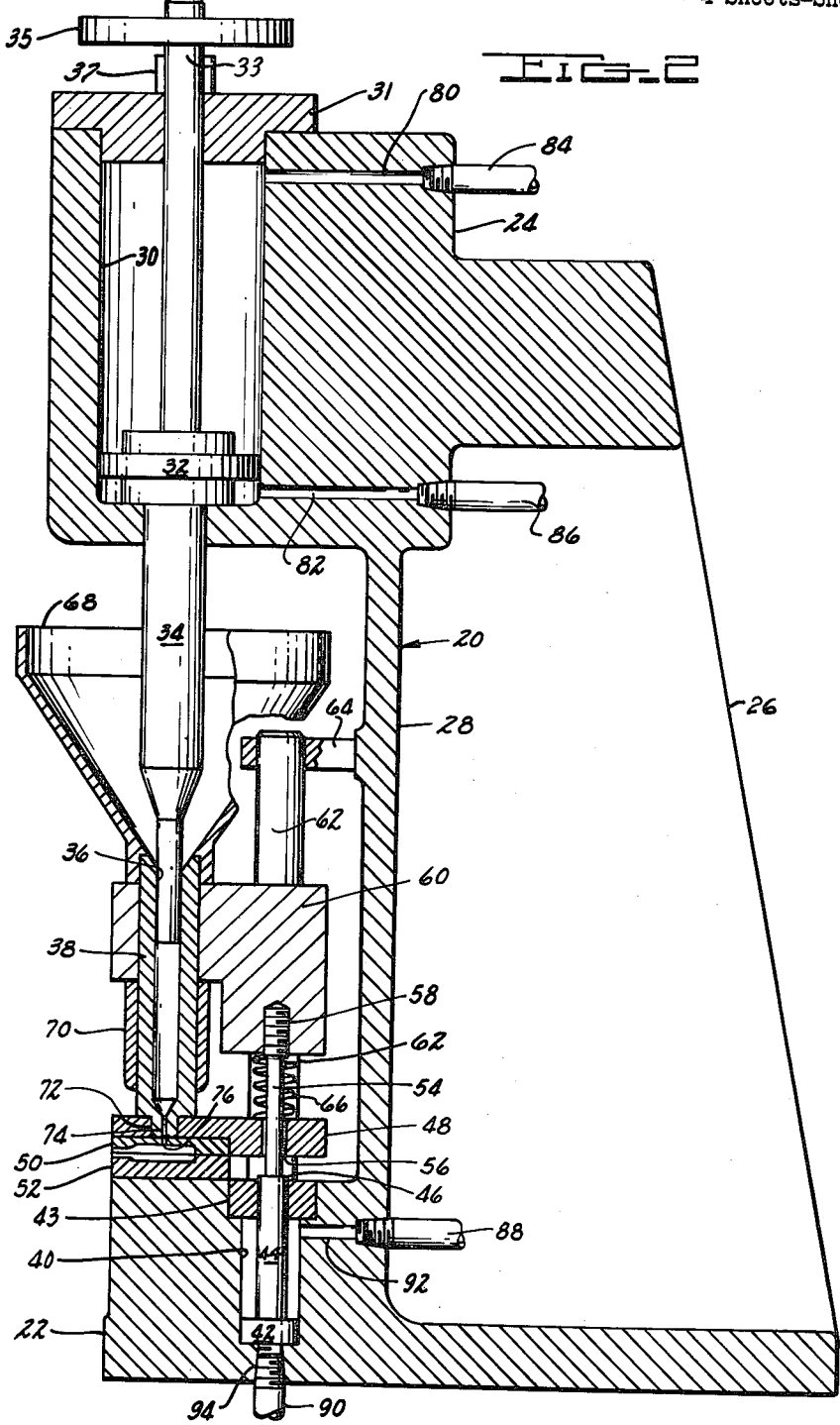

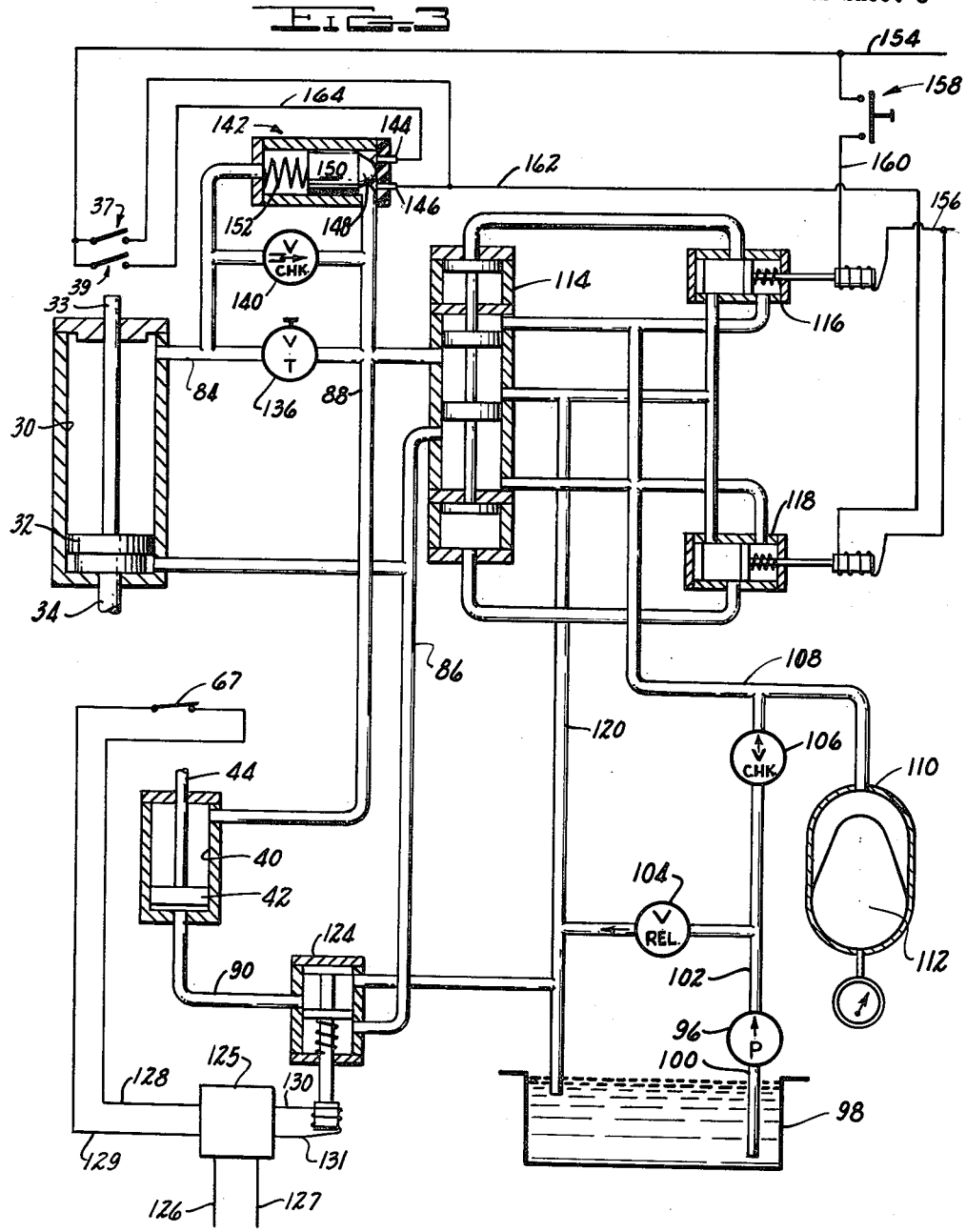

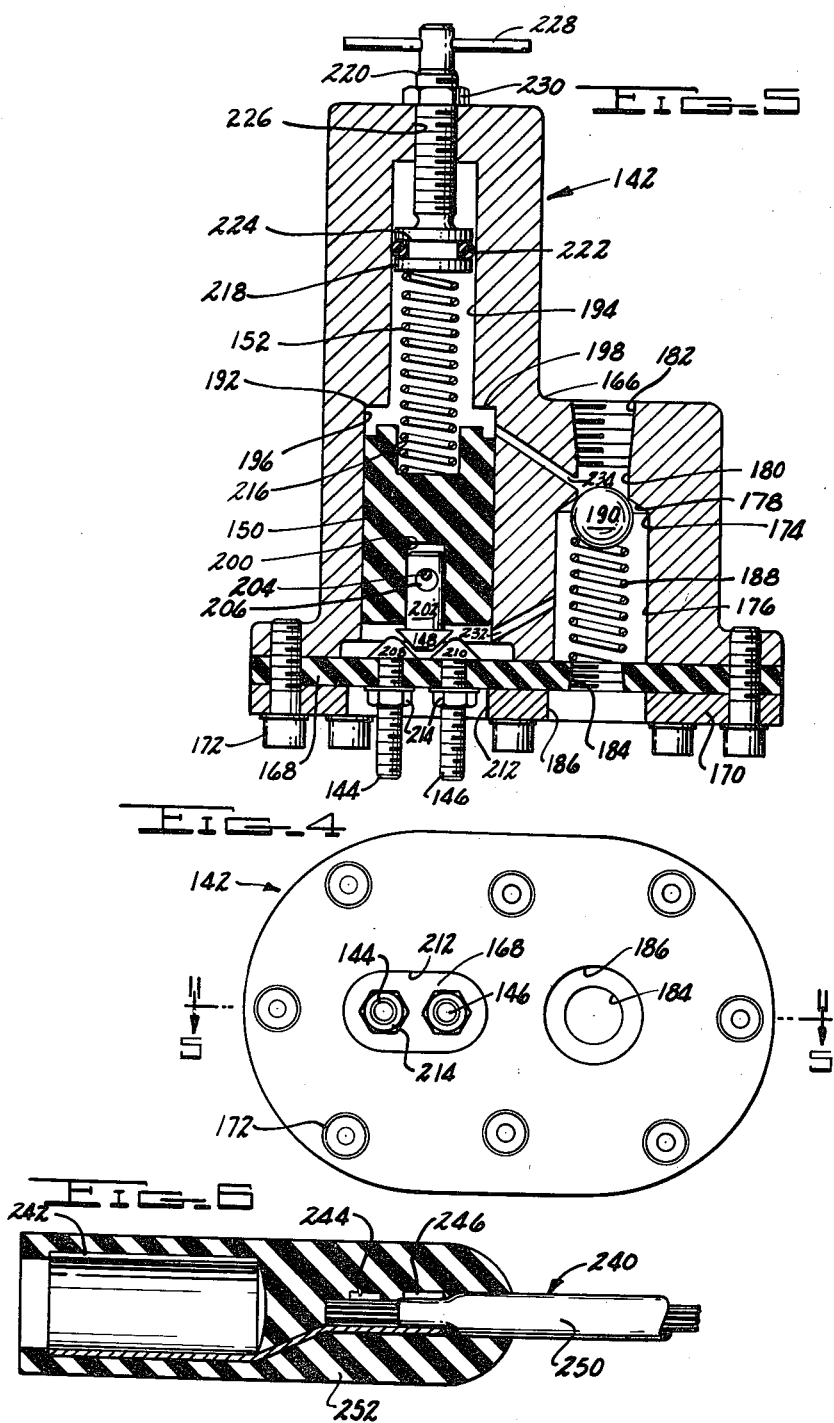

2,983,956
INJECTION MOLDING MACHINE

Ralph A. Vogel, Jr., Lancaster, Ohio, and Gordon C. Pulling, Birmingham, Mich., assignors to Essex Wire Corporation Filed Mar. 13, 1958, Ser. No. 721,230
3 Claims. (Cl. 18—30)

This invention relates to improvements in injection molding machines and, more particularly, to an improved control of the molding cycle of injection molding machines and to means used to effect such control.

In the typical injection molding machine, divided molds are pressed together by a hydraulic ram whereupon a second hydraulic ram is employed to force heated molding material through a nozzle into the closed mold. In the operation of such injection molding machines, it is essential that the molds be tightly clamped together during the injection of the plastic material and that the correct amount of heated plastic material be injected into the mold to just exactly fill the mold or else imperfectly formed articles may be molded. One standard practice has been to inject a charge of plastic material having the theoretical volume or weight necessary to completely fill the molds. Another practice is to reduce the fluid pressure applied to the injection ram when the mold pressure attains a specific pressure. While machines constructed and operated according to the above practices have been generally satisfactory for molding articles of certain shapes and sizes, such machines are somewhat complicated and expensive in construction and operation for molding a plastic insulating sheath about the ferrule portion of an electrical terminal after it has been joined to an electrical conductor.

Accordingly, it is an object of this invention to provide an improved, more efficient, and yet simplified injection molding machine.

Another object of this invention is to provide a faster, more reliable, and more efficient injection molding machine which is suitable for molding an insulating sheath about an electrical terminal.

Still another object of this invention is to provide an improved control system for a hydraulically operated injection molding machine that will automatically insure the injection of the proper amount of molding material into the molds.

A further object of this invention is to provide means for an injection molding machine to insure that the molds are tightly clamped together during injection of molding material.

According to the present invention in an injection molding machine of the type described, means are provided in association with the supply line to the injection ram cylinder to automatically return the ram when the hydraulic fluid flow to the injection ram cylinder decreases to a specified low value as the molds become filled. The invention also provides for utilizing the injection ram to hold the molds clamped while plastic material is being injected into the mold.

Other objects, features, and advantages of the invention will be apparent from a consideration of the following description taken in connection with the accompanying drawings, in which, Figure 1 is a front elevation of a portion of a hydraulically operated injection molding machine according to the present invention.

Figure 2 is a sectional view taken subsantially on the line 2—2 of Figure 1.

Figure 3 is a schematic diagram of the hydraulic and electrical control system of the injection molding machine.

Figure 4 is an end view of a combined pressure sensing switch and check valve.

Figure 5 is a longitudinal sectional view taken along line 5—5 of Figure 4.

Figure 6 is an enlarged longitudinal sectional view of a connector with the wire to which it is attached shown in elevation.

Referring to Figures 1 and 2, a rigid frame 20 forms the principal support for the parts associated with the injection molding machine. The frame 20 comprises a base 22, a head 24, and two vertical supports one of which is shown at 26. The vertical supports 26 are integral with the base 22 and the head 24 and are joined by a web portion 28. The head 24 has a cylindrical bore 30 in which a piston 32 is slidably fitted. Extending from the piston 32 is a ram 34 arranged for reciprocation within the bore 36 of the injection cylinder 38. Attached to the piston 32 and extending through an endplate 31 secured to the frame head 24 is a rod 33 to which is attached disc means 35 for actuating limit switches 37 and 39 mounted upon the frame head 24.

The base 22 is provided with a cylindrical bore 40 in which a piston 42 is slidably fitted. Extending from the piston 42 and through an end plate 43 secured to the base 22 is a plunger 44. The plunger 44 has a shoulder 46 adapted to engage the lower surface of platen 48 which carries the top portion 50 of a mold for movement relative to the bottom mold portion 52 attached to the base 22. The plunger 44 has a reduced diameter portion 54 extending through opening 56 of the platen 48 and having a threaded end 58 secured to the injection cylinder support 60. Platen 48 and support 60 are slidably mounted upon guide rods 62 which are supported by the base 22 and a cross bar 64 suitably secured to the web portion 28. Springs 66 are provided between platen 48 and support 60 to urge the injection cylinder 38 away from platen 48. A limit switch 67 is suitably secured to the frame web portion 28 for actuation by support 60.

Attached to the upper end of the injection cylinder 38 is a hopper 68 in which powdered molding material is placed. An electric heating coil 70 surrounds the injection cylinder 38 for heating molding material pressed into the cylinder 38 by the plunger 34. The lower end of the injection cylinder 38 is provided with a nozzle 72 having an orifice 74 aligned with the sprue 76 of the top portion 50 of the mold such that liquified molding material may be injected into the mold when the shoulder of injection cylinder 38 is forced against platen 48.

The bores 30 and 40 are provided with fluid passages through which hydraulic fluid is supplied to operate pistons 32 and 42. Bore 30 is provided with two passageways 80 and 82 from which conduits 84 and 86, respectively, extend. Conduits 88 and 90 similarly extend from their respective passageways 92 and 94 which lead from bore 40.

Referring now to Figure 3, there is shown the hydraulic and electrical control circuits for the apparatus just described. A pump 96 is connected to draw hydraulic fluid from a reservoir 98 through a conduit 100. The pump 96 discharges fluid at a high pressure into a conduit 102 which is connected to the inlet side of a pressure relief valve 104 which regulates the outlet fluid pressure. Conduit 102 is also connected to the inlet of flow control valve 106 which permits free flow of the hydraulic fluid from pump 96 while restricting the rate of return flow to the reservoir 98 through the pump 96 when the pump is not operating. The discharge side of flow control valve 106 is connected by conduit 108 to a bag type accumulator 110. The accumulator bladder 112 is precharged with compressed gas at a pressure approximately one-half of the normal operating pressure of pump 96. Branches of conduit 108 lead to the input ports of a pilot operated four-way valve 114 and to two solenoid-operated valves 116 and 118 which control the operation of valve 114. Branches of conduit 120 are connected to valves 114, 116, and 118 to provide a return path for the flow of hydraulic fluid to reservoir 98.

The valve 114 includes a first outlet port connected by conduit 86 to the ram bore 30 and connected through conduit 86, solenoid-operated valve 124, and conduit 90 to the plunger bore 40. Valve 124 is employed to delay the opening of mold portions 50 and 52 after retraction of ram 34 to permit the injected molding material to solidify. The second outlet port of valve 114 is connected by conduit 88 to the plunger bore 40 and is connected through conduit 88, flow restricting valve 136, and conduit 84 to the ram bore 30. Valve 136 serves to restrict the fluid flow in bore 30 thereby insuring that the mold portions 50 and 52 are tightly clamped together and that the nozzle 72 is in engagement with the top portion 50 of the mold before the ram forces molding material through the nozzle 72. Rapid retraction of the ram is provided by check valve 140 which is connected in parallel with valve 136 to allow the fluid in bore 30 to flow back freely through valve 114 into reservoir 98 when piston 32 is returned upwardly. Also connected in parallel with valve 136 is a differential pressure operated switch 142 comprising two stationary contacts 144 and 146 normally engaged by a bridging contact 148 which is carried by a movable plunger 150. Plunger 150 is normally held in the position shown in Figure 3 by spring 152 but is movable to disengage contact 148 from contacts 144 and 146 upon fluid flow through valve 136 when the pressure drop across valve 136 has attained a value such as to overcome spring 152.

In the electrical control system, electrical power preferably from a D.C. condenser discharge type power supply is supplied to the control circuit through power leads 154 and 156. Lead 156 is connected with one side of the solenoid coils of valves 116 and 118, and lead 154 is connected to one side of start switch 158 and limit switches 37 and 39. The other side of switch 158 is connected by lead 160 to the solenoid of valve 116 so that when switch 158 is momentarily closed, a circuit will be completed through lead 154, switch 158, lead 160, the solenoid of valve 116, and lead 156. Contact 146 of switch 142 is connected by lead 162 to one side of switch 37 and to one side of the solenoid of valve 118. Terminal 144 of valve 142 is connected by lead 164 to one side of switch 39. Limit switch 39 closes upon initial movement downward of rod 33 and when the pressure drop across valve 136 decreases to a sufficiently low value, contacts 144 and 146 will be bridged by contact 148 to complete a circuit comprising lead 154, switch 39, contacts 144, 146, and 148, lead 162, the solenoid of valve 118, and lead 156. If contacts 144 and 146 of switch 142 are not bridged by contact 148 after a predetermined downward movement of rod 33, limit switch 37 is closed to shunt switches 39 and 142 and thereby energize the solenoid of valve 118.

The electrical control system also includes a timer 125 supplied with electrical power from power leads 126 and 127. Switch 67 is connected to timer 125 by leads 128 and 129, and upon actuation by the injection cylinder support 60 after the shoulder of the injection cylinder 38 abuts platen 48, switch 67 is closed to complete a circuit setting the timer 125 in operation. The solenoid of valve 124 is connected to the timer 125 by leads 130 and 131 and after a set time period of operation a switch (not shown) within the timer is closed to energize the solenoid of valve 124. After a second period of time also determined by the setting of the timer, the solenoid of valve 124 is deenergized.

Except for the pressure sensing switch 142, the various controls employed in the hydraulic and electrical control systems are well known in the art and therefore further description thereof is not deemed necessary. The construction of switch 142 is illustrated in detail in Figures 4 and 5 where switch 142 is shown combined with check valve 140 in a common housing 166 closed at one end by cover plate 168 of insulating material. Cover plate 168 is held against the housing 166 by end plate 170 which is secured to the housing 166 by screws 172. Housing 166 is provided with a first open ended bore 174 extending therethrough and comprising a cylindrical portion 176 joined by a conical portion 178 to a cylindrical portion 180 of reduced diameter which includes a threaded portion 182 for receiving one end of conduit 84. The cover plate 168 has a threaded opening 184 aligned with bore 174 and opening 186 in the end plate 170 for receiving one end of conduit 88. One end of a coil spring 188 located within the bore portion 176 abuts against the cover plate 168 and the other end urges a ball 190 into seating engagement with the bore conical portion 178. It will be seen that if the fluid pressure in bore portion 180 is sufficiently greater than the fluid pressure in bore portion 176, the difference in pressure will displace the ball 190 from the conical bore portion 178 to allow hydraulic fluid to flow freely through bore 174. However, hydraulic fluid cannot flow in the opposite direction through bore 174.

The housing 166 has a second bore 192 comprising a cylindrical portion 194 and a cylindrical portion 196 of larger diameter which includes a shoulder 198. Plunger 150 formed from an insulating material such as nylon is disposed in bore portion 196 with a sealing sliding fit around the entire periphery of bore portion 196. The plunger 150 has a centrally located bore 200 in which the stem 202 of bridging contact 148 is secured by a pin 204 disposed in opening 206 of contact 148 and carried by the plunger 150. Spaced contact screws 144 and 146 are mounted upon the cover plate 168 and have heads 208 and 210, respectively, adapted to be engaged by contact 148. The contact screws 144 and 146 extend through an opening 212 in the end plate 170 and are secured to the cover plate 168 by lock nuts 214. Coil spring 152 has one end disposed in bore 216 of plunger 150 and its other end bears against the head 218 of adjustment screw 220 to urge contact 148 into engagement with contacts 144 and 146. A rubber O-ring 222 is carried in groove 224 of the screw head 218 to prevent leakage of hydraulic fluid through the threaded opening 226 of housing 166 in which adjustment screw 220 is threaded. Adjustment screw 220 is provided at its external end with a transversely disposed rod 228 for rotating screw 220 to adjust the force of spring 152 against plunger 150. Lock nut 230 is employed to lock screw 220 in its adjusted position.

Duct 232 provides a fluid passageway between bore portion 176 and one end of bore portion 196. A second duct 234 connects bore portion 180 to the other end of bore portion 196. It will be seen that one end of plunger 150 is subjected to the fluid pressure in conduit 84 and that the other end of plunger 150 is subjected to the fluid pressure in conduit 88. If the fluid pressure in conduit 88 is sufficiently greater than the pressure in conduit 84, plunger 150 is displaced to disengage contact 148 from contacts 144 and 146. Shoulder 198 in bore 192 serves to limit the displacement of plunger 150. When the pressure differential is reduced, the coil spring 152 will return the plunger 150 and the bridging contact 148 will again engage contacts 144 and 146. The loose fit of pin 204 in opening 206 of stem 202 and the loose fit of stem 202 in bore 200 of plunger 150 permit proper alignment of bridging contact 148 with stationary contacts 144 and 146. If the fluid pressure in conduit 84 is greater than the fluid pressure in conduit 88, contact 148 will remain in engagement with contacts 144 and 146.

The operation of the injection molding machine is as follows:

With the parts of the machine in the positions shown in the drawings, the hopper 68 is filled with molding material and the injection cylinder 38 is heated to the required temperature. When pump 96 is actuated, hydraulic fluid is pumped into accumulator 110 against a predetermined pressure of the gas contained in bladder 112 until the pressure in the accumulator rises to the normal regulated pressure of the pump 96. At the same time fluid pressure is supplied to the lower side of the ram piston 32 to raise ram 34. After a period of time determined by the setting of timer 125, fluid pressure is applied to the lower side of piston 42 to raise the injection cylinder 38 carried by support 60 and to raise the top mold portion 50 carried by platen 48. It will be noted that the support 60 is raised a small amount before shoulder 46 of plunger 44 engages platen 48 so that nozzle 72 is separated from the top mold portion 50. This separation of the nozzle from the mold prevents the transfer of heat from the injection cylinder 38 to the mold top portion 50 when the mold portions 50 and 52 are separated.

The injection molding machine is ready at this point to perform a molding operation. One end of a wire having a terminal about which it is desired to mold an insulating sheath of thermoplastic material such as polyvinyl chloride may be placed in the bottom portion 52 of the mold. One form such a terminal and wire may take is shown in Figure 6. Wire 240 is electrically and mechanically attached to a generally cylindrical terminal 242 by means of tail portions 244 and 246 which are folded, respectively, against conductor 248 and insulating sheath 250 of wire 240. The insulating sheath to be applied by the injection molding machine is shown at 252. The particular connector construction illustrated is described in detail in patent application No. 639,872 filed February 13, 1957, by H. A. Elliott et al. and owned by the same assignee as the instant application.

In beginning the molding operation, start switch 158 is momentarily closed to energize the solenoid of pilot valve 116 and thereby supply hydraulic fluid through valve 116 to shift the spool of four-way valve 114 to a position away from that shown in Figure 3. With the valve 114 so set, hydraulic fluid from the accumulator 110 flows through conduit 108, valve 114, and conduit 88 to the upper portion of the plunger cylinder 40 to press the top mold portion 50 against the bottom mold portion 52 and to bring the nozzle 72 of the injection cylinder 38 adjacent the sprue 76 in the top mold portion 50. At the same time fluid also flows through conduit 88, restriction valve 136, and conduit 84 into the upper portion of the ram cylinder 30 to advance piston 32 downward whereby ram 34 presses powdered molding material into the injection cylinder 38. Fluid displaced by movement of piston 32 is returned to the reservoir through conduit 86, valve 114, and conduit 120, while fluid displaced by piston 42 returns to the reservoir through conduit 90, valve 124, and conduit 120.

The pressure of ram 34 against the molding material in the injection cylinder 38 cooperates with the heat from heating coil 70 to liquefy the molding material. Further downward movement of ram 34 forces the liquefied molding material through the nozzle orifice 74 and the mold sprue 76 into the mold cavity. Because valve 136 restricts fluid flow to ram cylinder 30 to limit the rate of downward movement of ram 34, the plunger piston 42 completes its stroke to close the mold portions 50 and 52 before ram 34 begins to force liquefied molding material from the nozzle. It will be seen that the downward force of ram 34 aids plunger 44 in holding mold portions 50 and 52 closed against the pressure of the injected molding material and, thus piston 42 of cylinder 40 need provide only a relatively low force sufficient to close the mold and to raise the platen 48 and support 60.

Upon downward movement of piston 32, switch 39 is closed but the pressure drop across valve 136 with fluid flow into cylinder 30 causes piston 150 of the pressure switch 142 to disengage contact 148 from contacts 144 and 146 to prevent energization of the solenoid of valve 118. However, as soon as the mold cavity is filled, the rate of movement of the ram 34 and the ram piston 32 abruptly decrease and the fluid flow into cylinder 30 is accordingly reduced. This reduction in fluid flow will immediately cause a reduction in the differential pressure applied to pressure switch 142 and contacts 148 will re-engage contacts 144 and 146 to complete a circuit energizing the solenoid of valve 118.

When the solenoid of valve 118 is energized, valve 118 supplies hydraulic fluid to shift the spool of valve 114 to the position shown in Figure 3 of the drawing. With the valve 114 so set, the upper portion of cylinder 30 is connected to the reservoir through conduit 84, check valve 140, conduit 88, valve 114, and conduit 120. Simultaneously, hydraulic fluid at a high pressure is supplied through conduit 108, valve 114, and conduit 86 to retract ram 34 and prevent any further injection of molding material into the mold cavity. The adjustment screw 220 of pressure switch 142 should be set so that contacts 144 and 146 are engaged by bridging contact 148 at the proper instant so that the solenoid of valve 118 will be energized when the mold cavity is almost exactly filled with molding material. The setting of switch 142 which is dependent upon the adjustment of valve 136 may be determined by trial and error noting the form of several test pieces. If for some reason the mold cavity is not tightly closed and it is not possible to completely fill it, switch 37 is closed after a predetermined movement of ram 34 sufficient to allow complete filling of the mold cavity, and the solenoid of valve 118 is energized to retract ram 34.

At the instant fluid pressure is applied through conduit 86 to ram cylinder 30 to retract ram 34, valve 114 also connects conduits 88 and 120 so that the upper portion of mold 40 is connected to reservoir 98. This lowers the pressure in the upper portion of cylinder 40 to permit springs 66 to move the injection cylinder support 60 away from the platen 48 to a position where shoulder 46 of plunger 44 engages the lower side of platen 48. It will be seen that the nozzle 72 of the injection cylinder 38 is retracted a small distance from the top mold portion 50 immediately after the injection of molding material into the mold cavity has been completed to keep the transfer of heat to the mold from the injection cylinder at a minimum value.

Meanwhile, the mold portions 50 and 52 remain closed until the solenoid of valve 124 is energized to permit hydraulic fluid to flow through valve 124 to raise platen 48. Energization of the solenoid of valve 124 is effected by timer 125 which had been set in operation upon actuation of switch 67 by support 60 near the limit of its downward movement. After operation of the timer for a set period of time during which the injection ram completes its injection stroke and the molding material injected into the mold cavity sets, the timer 125 energizes the solenoid of valve 124. Thereupon valve 124 is operated to connect conduit 90 and the lower portion of cylinder 40 to the accumulator 110 through conduit 86, valve 114, and conduit 108. At this time, the top mold portion 50 and the injection cylinder 38 are raised by plunger 44 to permit removal of the molded article. The timer 125 maintains the solenoid of valve 124 energized for a period of time sufficient for plunger 44 to complete its upward movement whereupon the timer 125 deenergizes the solenoid of valve 124 and restores itself to a condition for repetition of another molding cycle.

While the invention has been illustrated and described in its preferred embodiment and has included certain details, it should be understood that the invention is not to be limited to the precise details herein illustrated and described since the invention may be carried out in other ways falling within the scope of the invention as claimed.

What is claimed is:

1. In an injection molding machine of the type having a fluid pressure actuator movable to advance and retract an injection ram within an injection cylinder for forcing molding material into a mold cavity, the combination of: a fluid pressure source; valve means selectively operable to supply fluid from said fluid pressure source to said actuator to advance and retract said ram; restriction means connecting said valve means to said actuator when said valve means is operable to supply fluid for advancing said ram whereby a pressure differential is developed when fluid flows through said restriction means; a differential pressure responsive means connected to opposite sides of said restriction means; and means controlled by said differential pressure-responsive means and operable when said pressure differential decreases to a predetermined value during advancement of said ram to shift said valve means to initiate retraction of said ram.

2. In an injection molding machine of the type having a fluid pressure actuator movable to advance and retract an injection ram within an injection cylinder for forcing molding material into a mold cavity, the combination of: a fluid pressure source; a valve selectively operable to supply fluid from said fluid pressure source to said actuator to advance and retract said ram; a restricted passage connecting said valve to said actuator when said valve is operable to supply fluid to said actuator for advancing said ram; a first electrical circuit including a first solenoid for actuating said valve to supply fluid for advancement of said ram when energized, and a start switch having normally open contacts connected to energize said first solenoid when closed; and a second electrical circuit incuding a second solenoid for actuating said valve to supply fluid for retraction of said ram when energized, a differential pressure switch connected to opposite sides of said restricted passage to be responsive to the pressure drop in said restricted passage and having contacts which are closed execpt when the pressure drop in said restricted passage exceeds a predetermined minimum; a limit switch having normally open contacts adapted to be closed when the ram is advanced from its retracted position; and a third electrical circuit connecting said differential pressure switch and said limit switch in series with each other and with said second circuit.

3. An injection molding machine comprising a mold having a movable portion and a relatively fixed portion; an injection cylinder having an injection ram movable therein for injecting molding material into said movable mold portion; said movable mold portion, said injection cylinder and said injection ram being reciprocal in the same directions; said movable mold portion being disposed between said fixed mold portion and said injection cylinder, and constructed and arranged to be moved into engagement with said fixed mold portion by said injection cylinder; a fluid power injection actuator for advancing and retracting the injection ram; a closing actuator connected to said injection cylinder to advance and retract said injection cylinder and operable upon advancement thereof to move said injection cylinder into engagement with said movable mold portion and to thereby move said movable mold portion into closing engagement with said fixed mold portion for clamping said mold portions together; said injection ram and said injection cylinder being constructed and arranged to exert a mold-closing force against said movable mold portion during injection of molding material into said mold; the mold-closing force of said closing actuator being less than the force required to hold said mold portions closed against the pressure of said injected molding material; a fluid pressure source for said injection actuator and said clamping actuator; control valve means selectively operable to supply fluid from said fluid pressure source to said injection and closing actuators to advance and retract said injection ram and said injection cylinder; restriction means connecting said valve means to said injection actuator when said valve means is operable to supply fluid for advancing said ram whereby a pressure differential is developed when fluid flows through said restriction means; a differential pressure-responsive means connected to opposite sides of said restriction means; and means controlled by said differential pressure-responsive means and operable when said pressure differential decreases to a predetermined value during advancement of said injection ram to shift said valve means to initiate retraction of said ram and said cylinder.

References Cited in the file of this patent

UNITED STATES PATENTS

| 2,259,781 | Shaw et al. | Oct. 21, 1941 |
| 2,402,805 | Cousino | June 25, 1946 |
| 2,470,402 | Jobst | May 17, 1949 |
| 2,568,042 | Vltavsky | Sept. 18, 1951 |
| 2,775,982 | Canfield | Jan. 1, 1957 |

FOREIGN PATENTS

| 550,767 | Great Britain | Jan. 22, 1943 |